United States Patent
Sakic et al.

(10) Patent No.: US 10,890,901 B2
(45) Date of Patent: Jan. 12, 2021

(54) CONTROL UNIT AND METHOD FOR OPERATING AN INDUSTRIAL AUTOMATION SYSTEM COMMUNICATION NETWORK COMPRISING A PLURALITY OF COMMUNICATION DEVICES

(71) Applicant: SIEMENS AKTIENGESELLSCHAFT, Munich (DE)

(72) Inventors: Ermin Sakic, Munich (DE); Andreas Zirkler, Ottobrunn (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/633,096

(22) PCT Filed: Jul. 20, 2018

(86) PCT No.: PCT/EP2018/069708
§ 371 (c)(1),
(2) Date: Jan. 22, 2020

(87) PCT Pub. No.: WO2019/020500
PCT Pub. Date: Jan. 31, 2019

(65) Prior Publication Data
US 2020/0233402 A1 Jul. 23, 2020

(30) Foreign Application Priority Data

Jul. 28, 2017 (EP) .................................... 17183729

(51) Int. Cl.
*G05B 19/418* (2006.01)

(52) U.S. Cl.
CPC ..... *G05B 19/4185* (2013.01); *G05B 19/4183* (2013.01); *G05B 19/41865* (2013.01); *G05B 19/41885* (2013.01)

(58) Field of Classification Search
CPC ............ G05B 19/4185; G05B 19/4183; G05B 19/41865; G05B 19/41885;
(Continued)

(56) References Cited

U.S. PATENT DOCUMENTS

| 9,258,765 | B1 * | 2/2016 | daCosta | H04L 41/12 |
| 2013/0268686 | A1 * | 10/2013 | Wang | H04L 65/1069 |
| | | | | 709/228 |

(Continued)

FOREIGN PATENT DOCUMENTS

| DE | 10138363 | 2/2003 |
| EP | 2795842 | 10/2014 |

(Continued)

OTHER PUBLICATIONS

Gopalakrishnan Abhilash et al: "Industrial Automation System on Device (IndASoD)—A device modeling industrial automation scenarios", 2014 Annual IEEE India Conference (INDICON), IEEE, pp. 1-6.

(Continued)

*Primary Examiner* — Ziaul Karim
(74) *Attorney, Agent, or Firm* — Cozen O'Connor (57) ABSTRACT

A control unit and method for operating an industrial automation system communication network that includes a plurality of communication devices, wherein a plurality of control units redundant with respect to each other controls functions of a plurality of associated communication devices, where the communication devices transmit communication-specific input variables to all associated redundant control units, output variables (produced by the control units redundant with respect to each other are checked for deviations from each other, and where if there are deviations, then a switchover is made to reserve control units or control units having output variables that deviate with respect to a majority of control units redundant to each other are deactivated.

20 Claims, 3 Drawing Sheets

(58) Field of Classification Search
CPC ........... G05B 2219/14124; G05B 2219/25232; G05B 19/058; G05B 19/052; G05B 2219/24182; G05B 19/0428; Y02P 90/80; Y02P 90/02; H04L 41/0668; H04L 41/0695

See application file for complete search history.

(56) References Cited

U.S. PATENT DOCUMENTS

| | | | |
|---|---|---|---|
| 2014/0185427 A1* | 7/2014 | Ditzel, III | H04L 12/437 370/223 |
| 2014/0211661 A1 | 7/2014 | Gorkemli et al. | |
| 2015/0312132 A1* | 10/2015 | Gorkemli | H04L 43/10 370/244 |

FOREIGN PATENT DOCUMENTS

| | | |
|---|---|---|
| EP | 2800304 | 11/2014 |
| WO | 2017064560 | 4/2017 |

OTHER PUBLICATIONS

PCT International Search Report and Written Opinion of International Searching Authority dated Nov. 15, 2018 corresponding to PCT International Application No. PCT/EP2018/069708 filed Jul. 20, 2018.

* cited by examiner

CONTROL UNIT AND METHOD FOR OPERATING AN INDUSTRIAL AUTOMATION SYSTEM COMMUNICATION NETWORK COMPRISING A PLURALITY OF COMMUNICATION DEVICES

CROSS-REFERENCE TO RELATED APPLICATIONS

This is a U.S. national stage of application No. PCT/EP2018/069708 filed Jul. 20, 2018. Priority is claimed on EP Application No. 17183729 filed Jul. 28, 2017, the content of which is incorporated herein by reference in its entirety.

BACKGROUND OF THE INVENTION

1. Field of the Invention

The invention relates to industrial automation systems and, more particularly, to a control unit and method for operating an industrial automation system communication network comprising a plurality of communication devices.

2. Description of the Related Art

Industrial automation systems are used for the monitoring and open-loop and closed-loop control of technical processes, especially in the fields of production, process and building automation, and enable an operation of control devices, sensors, machines and industrial systems which is designed to occur as autonomously and independently of human intervention as possible. As a result of the steadily increasing importance of information technology for automation systems comprising numerous networked control and computer units, methods for the reliable provision of functions distributed via an automation system for the provision of monitoring, open-loop and closed-loop control functions are gaining increased importance. A particular set of problems in industrial automation systems results from a message traffic consisting of relatively many but relatively short messages, which reinforces the above-mentioned problems.

Software Defined Networking (SDN) aims to provide a visualization of communication network functions by functionally separating communication devices, such as routers or switches, into components assigned to a Control Plane and Data Plane. The Data Plane comprises functions and/or components for forwarding data packets or data frames. The Control Plane, on the other hand, comprises management functions for controlling the transport and/or the components of the Data Plane. The OpenFlow system, for example, defines a standard for software-implemented control planes. An abstraction of hardware as virtual services allows a manual configuration of the hardware to be dispensed with, in particular by creating a programmable, centralized control of network traffic. OpenFlow supports a partitioning of system resources into network slices, which ensures a provision of defined system resources independently of other existing network slices.

US 2013/268686 A1 discloses a method for sending a request to establish a connection, in which an OpenFlow switch sends a message with a parameter request to a configuration server to obtain connection parameters from an OpenFlow controller. In response to the message with the parameter request, the OpenFlow switch receives an IP address and a set of OpenFlow connection parameters from the configuration server, where the set of OpenFlow connection parameters comprises at least connection parameters of a first OpenFlow controller. The OpenFlow switch sends a message corresponding to the IP address and the set of OpenFlow connection parameters of the first OpenFlow controller with a request to set up a connection to the first OpenFlow controller. In this way, an automatic connection between an OpenFlow switch and an OpenFlow controller can be set up.

DE 10 138 363 A1 discloses a method for ensuring the quality of service of internet applications, in which internet applications are automatically adjusted and optimized by taking advantage of the resources of the IP access network and the end system existing at the time of launching the internet application. The Quality of Service (QoS) communication requirements of Internet applications to the IP access network are acquired and stored as application profiles. When the internet application is enabled, the currently available network resources of the IP access network are compared with the stored application profiles, and control data are determined. Based on the determined control data, the provision of network resources for the relevant internet application is optimized. The optimization here relates to an adjusted timing sequence and the determination of the most favorable configuration from the point of view of cost aspects (transmission costs).

EP 2 795 842 B1 discloses a control unit for providing communications services within a physical communication network. These communications services are used by multiple applications running on communication devices, for each of which requirements on the communication services are specified. The control unit is used to generate a communication network model that reproduces a topology of the physical communication network and comprises a network node model for each communication device. The network node model describes functions and resources of the respective communication device. In addition, for each application running on the communication devices, the control unit calculates a virtual communication network, by the requirements of the respective application on the communication services being mapped onto the communication network model. The calculated virtual communication networks each comprise at least 2 network nodes described by a network node model and a partition or network slice of selected communication network resources that are provided by the communication devices.

WO 2017/064560 A1 discloses a system for software defined automation (SDA), which comprises a plurality of programmable logic controllers (PLC) and distributed control units arranged at a higher-level. The higher-level control units monitor activities of the programmable logic controllers. In particular, the higher-level control units monitor aspects of program control, network and safety within a first sub-system that comprises multiple programmable logic controllers as components. Upon detection of a fault or a critical event, in the first sub-system at least one component of the first sub-system is restored to a properly functional state. This will also trigger a recovery of corresponding components in a second and third sub-system. In this way, the three subsystems are kept in a coherent state with respect to their components. The disadvantage, however, is that a fault in one sub-system triggers recovery actions in another, possibly completely unaffected sub-system, instead of using existing redundancies for an uninterrupted operation.

SUMMARY OF THE INVENTION

It is an object of the present invention to provide a control unit and method for the efficient and reliable operation of a communications network comprising numerous communication devices for an industrial automation system, which enables a fail-safe and manipulation-proof control of communication device functions using higher-level control units.

This and other objects and advantages are achieved in accordance with the invention by a method, and a control unit, where a plurality of mutually redundant control units control functions of a plurality of assigned communication devices. The mutually redundant control units comprise identically configured state machines which, in an error-free state, generate identical output variables given identical input variables. Preferably, the state machines of the mutually redundant control units are replicated state machines. The communication devices are associated with a Software Defined Network, which comprises a communication control level designated as the Control Plane and a data transfer level designated as the Data Plane. The control units are assigned to the Control Plane, while the communication devices are assigned to the Data Plane.

In accordance with the invention, for user-side communication service requests, the control units determine a path between a first communication device at a first end node and a second communication device at a second end node via third communication devices, and check whether necessary system resources are available along the determined paths during a scheduled usage period. In the case of a positive verification result, the control units reserve system resources necessary for each of the communication service requests and control routing or switching functions of the third communication devices in accordance with the determined paths. The third communication devices comprise routers or switches. The control units specify flow tables from which routing tables or forwarding tables are derived for third communication devices respectively assigned to the control units.

In accordance with the invention, the communication devices transmit communication-specific input variables, such as latency, jitter, data rate or bandwidth measurements and/or event messages from routers, switches or access points, to all assigned redundant control units. The output variables generated by the mutually redundant control units are checked for deviations in relation to each other, for example, via the mutually redundant control units or the assigned communication devices. In the event of deviations, either a switchover to reserve control units is performed or control units having output variables that deviate with respect to a majority of mutually redundant control units are deactivated.

In this way, control of the functions of the communication devices by the control units is secured against corrupted input and output variables of the control units and against failures of control units. In particular, it is thus possible to switch over seamlessly and selectively to using control units in which no faults are present. Thus, essentially no operational interruptions or delays will arise in the event of individual faulty control units.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention will be described in more detail below by reference to an exemplary embodiment based on the drawing, in which.

DETAILED DESCRIPTION OF THE EXEMPLARY EMBODIMENTS

Figure 1:
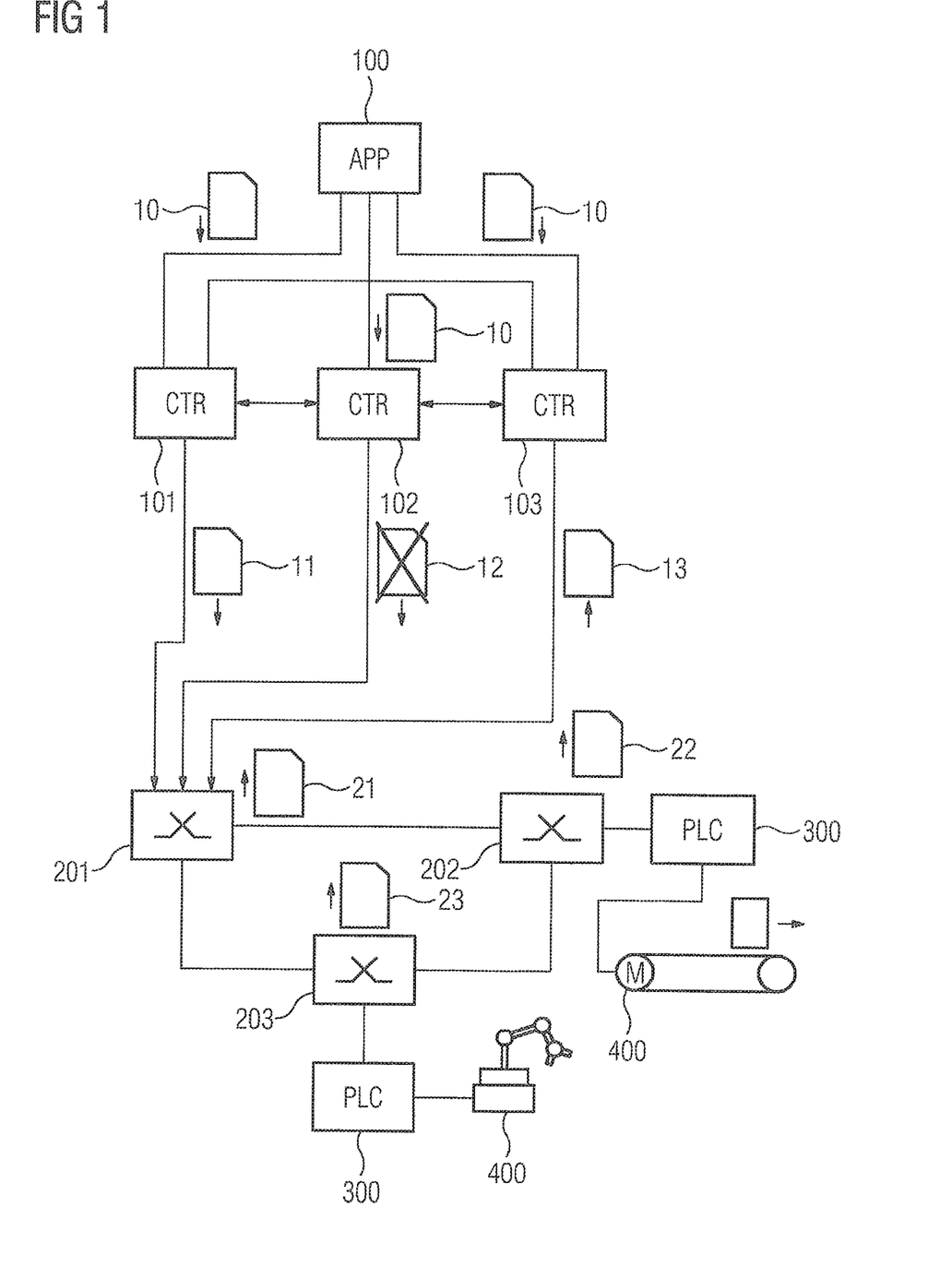
FIG. 1 a communication network of an industrial automation system comprising a plurality of communication devices and three mutually redundant control units in accordance with the invention.

The serial communication network of an industrial automation system shown in FIG. 1 comprises a plurality of communication devices 201, 202, 203 and three mutually redundant control units 101, 102, 103 that are assigned to the communication devices 201, 202, 203. The control units 101, 102, 103 are configured to control functions of the assigned communication devices 201, 202, 203 jointly with the other respective control units. The mutually redundant control units 101, 102, 103 comprise identically configured state machines, which in an error-free state generate identical output variables 11, 12, 13 given identical input variables for at least one selected communication device 201. Preferably, the state machines of the mutually redundant control units 101, 102, 103 are replicated state machines. Preferably, the mutually redundant control units 101, 103 authenticate themselves with respect to the redundant control units 201, 202, 203 and obtain control access to the assigned communication devices 201, 202, 203 only after successful authentication.

The communication devices 201, 202, 203 can be, for example, switches, routers or firewalls, and be used for connecting programmable logic controllers 300 or input/output units of the industrial automation system.

Programmable logic controllers 300 typically each comprise a communication module, a central unit and at least one input/output unit (I/O module), and thus also constitute communication devices. Input/output units can in principle also be formed as distributed peripheral modules, which are arranged remote from a programmable logic controller.

Via the communication module a programmable logic controller 300 is connected to a switch or router or additionally to a fieldbus, for example. The purpose of the input/output unit is to exchange control and measurement variables between the programmable logic controller 300 and a machine or device 400 that is controlled by the programmable logic controller 300. The central unit is provided in particular for determining suitable control variables from the recorded measurement variables. The above components of the programmable logic controller 300 in the present exemplary embodiment are connected to each other via a backplane bus system.

The communication devices 201, 202, 203 in this exemplary embodiment are assigned to a Software Defined Network (SDN), which comprises a communication control level designated as the Control Plane and a data transfer level designated as the Data Plane. The control units 101, 102, 103 as SDN controllers are assigned to the Control Plane, while the communication devices 201, 202, 203 are assigned to the Data Plane. Via the control units 101, 102, 103, flow tables for switches or routers are defined, for example, from which routing rules or forwarding rules for the communication devices 201, 202, 203 assigned to the respective control units 201, 202, 203 are derived.

The control units 101, 102, 103 determine, in particular for user-side communication service requests 10, a path between a first communication device 202 at a first end node and a second communication device 203 at a second end node via at least one third communication device 201. The first end node and the second end node represent service access points for the user-side communication service requests 10. The user-side communication service requests 10 are transmitted, for example, from an application or application control unit 100 to the mutually redundant control units 101, 102, 103. The control units 101, 102, 103 verify whether necessary system resources are available along each of the determined paths during a scheduled usage period. In the case of a positive verification result, the control units 101, 102 103 reserve necessary system resources for each of the communication service requests 10 and via their output variables 11, 12, 13 control routing or switching functions of the at least one third communication device 201 in accordance with the determined paths. For ease of presentation, the communication network comprises only three communication devices 201, 202, 203 to be controlled. However, this exemplary embodiment is readily transferable to more complex, meshed network topologies having a plurality of third communication devices.

In accordance with the invention, the communication devices 201, 202, 203 transfer communication-specific input variables 21, 22, 23 to all assigned redundant control units 101, 102, 103. These communication-specific input variables can comprise, for example, latency, jitter, data rate or bandwidth measurements or event messages from routers, switches or access points. The output variables 11, 12, 13 generated by the mutually redundant control units 101, 102, 103 are checked for deviations from each other. In the event of deviations, in the communication network shown in FIG. 1, control units having output variables that deviate with respect to a majority of mutually redundant control units are deactivated. In the present exemplary embodiment, for example, the output variable 12 of the control unit 102 differs from the identical output variables 11 and 13 of the control units 101 and 103. Therefore, in this case, the control unit 102 is deactivated. A deactivation can be performed, for example, by ignoring the output variable 12 in the selected communication device 201 or by marking a corresponding control path from the control unit 102 to the selected communication device 201 as unreliable. Preferably, a replacement path is calculated for a control path marked as unreliable, so that the control unit 102 can be reactivated if necessary. However, this presupposes that the control unit 102 always generates correct output variables. This can be verified, for example, by the two other control units 101 and 103.

The output variables 11, 12, 13 generated by the mutually redundant control units 101, 102, 103 can be checked for deviations either by the assigned communication devices 201, 202, 203, in particular by the selected communication device 201, or by the control units 201, 202, 203 themselves. In a similar way, the deactivation of the control unit 102 having an output variable 12 that deviates with respect to the majority of mutually redundant control units (here control unit 101 and control unit 103) is performed either by the assigned communication devices or by the control units themselves.

Preferably, the mutually redundant control units 101, 102, 103 compare input variables received from the assigned communication devices 201, 202, 203 among one another. In a similar procedure to that used for the output variables, control units having input variables that deviate with respect to a majority of the mutually redundant control units are advantageously deactivated. Here, deactivation can also be performed by marking a corresponding path from the respective communication device to the affected control unit as unreliable. If possible, a replacement path is calculated for a path marked as unreliable, in particular if there is no fault present in the affected control unit. The control units having input variables that deviate with respect to the majority of mutually redundant control units advantageously deactivate themselves, for example, by the generation of output variables being stopped or suspended.

The communication network of FIG. 1, for example, can be divided into a plurality of partitions that each comprise specifiable shares of system resources of the communication devices 201, 202, 203 that are assigned to the respective partition. Here, for user-side communication service requests within the partition assigned to the respective user, the control units 101, 102, 103 each determine a path between a first communication device at a first end node and a second communication device at a second end node via third communication devices. Accordingly, the control units 101, 102, 103 verify whether necessary system resources are available along each of the determined paths within the partition assigned to the respective user during a scheduled period. The partitions are, in particular, network slices that are defined using an engineering system, either manually by a system administrator or automatically. For each control unit 101, 102, 103 a separate resource layer with the shares of system resources is preferably provided.

Figure 2:
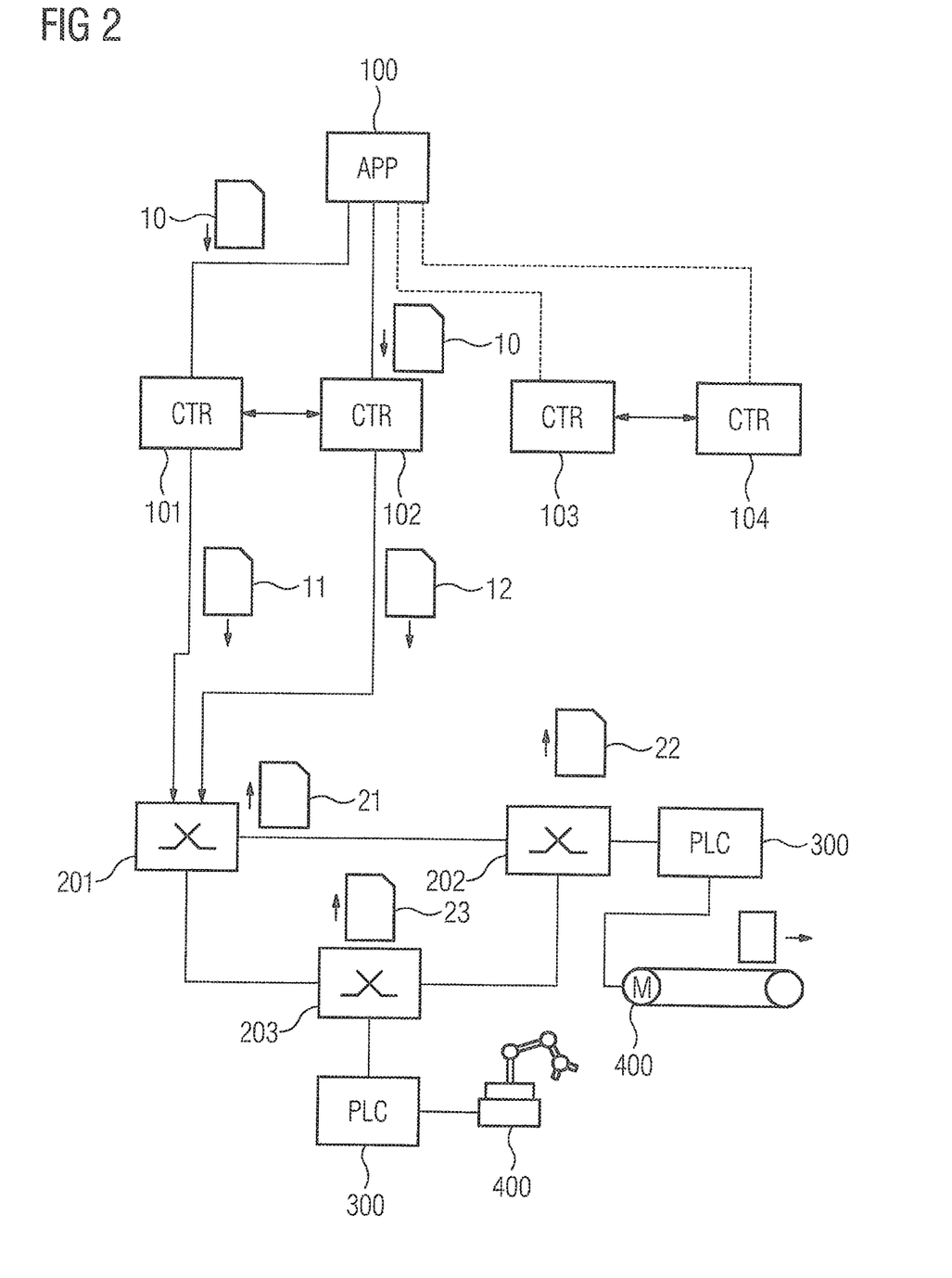
FIG. 2 a communication network of an industrial automation system comprising a plurality of communication devices and two pairs of mutually redundant control units in accordance with the invention.

In the communication network of FIG. 2, in contrast to the communication network shown in FIG. 1, two pairs of mutually redundant control units 101-102, 103-104 are provided. Here, one pair of mutually redundant main control units 101-102 is activated. In the event of deviations in the output variables generated by the mutually redundant main control units 101-102, a switchover is performed from the pair of mutually redundant main control units 101-102 to a pair of mutually redundant reserve control units 103-104. The mutually redundant main control units 101-102 preferably monitor each other for differing input or output variables and deactivate themselves if deviations are found. Furthermore, in the event of deviating output variables 11-12 of the mutually redundant main control units 101-102 and/or a self-deactivation indicated by the mutually redundant main control units 101-102, the assigned communication devices 201, 202, 203 switch over from the main control units 101-102 to the reserve control units 103-104. In addition, in accordance with the present exemplary embodiment pairs of mutually redundant main control units 101-102 assigned to the communication devices 201, 202, 203 are entered into a ("History") list. Former main control units entered in the list are preferably excluded from use as reserve control units for the respective communication devices.

For the pairwise mutual monitoring, the output variables 11-12 of the mutually redundant main control units 101-102 are advantageously transmitted to the respective other main control unit, in each case via at least 2 disjoint paths. The main control unit 101, for example, transmits its output variable 11 via path A and via path B, while the main control unit 102 transmits its output variable 12 via path C and path D. The paths A-D are disjoint.

For example, if the output variable 11 transmitted via path A matches the output variable 11 transmitted via path B and the output variable 12 transmitted via path C, and only the output variable 12 transmitted via path D deviates from them, path D can be detected by the main control unit 101 as having a malfunction. Here, no self-deactivation of the main control units 101-102 would be initiated yet, because in principle they generate correct and consistent output variables 11-12. In general, the mutually redundant main control units 101-102 preferably remain activated as long as they receive output variables of the other main control unit matching their own output variables via at least one path.

Furthermore, the output variables 11-12 of the mutually redundant main control units 101-102 are preferably transmitted to the assigned communication devices 201, 202, 203 via at least 2 disjoint paths per main control unit. The main control unit 101, for example, transmits its output variable 11 via path E and via path F to the selected communication device 201, while the main control unit 102 transmits its output variable 12 to the selected communication device 201 via path G and path H. The paths E-H are disjoint.

For example, if the output variable 11 transmitted via path E matches the output variable 12 transmitted via path H and only the output variable 11 transmitted via path F and output variable 12 sent via path G differ from them, the paths F and G can be detected by the selected communication device 201 as having a malfunction. However, this only applies if the output variable 11 transmitted via path F and the output variable 12 transmitted via path G differ from each other. Only in this case can the selected communication device 201 treat the output variable 11 transmitted via path E and the output variable 12 transmitted via path H as correct output variables of the main control units 101-102. In general, the mutually redundant main control units 101-102 for the selected communication device 201 can remain activated as long as the selected communication device 201 receives matching output variables from both main control units via at least 2 paths and output variables that differ from each other via the remaining paths. However, this would not apply, for example, if the output variable 11 transmitted via path F and the output variable 12 transmitted in the above example are matching. If they differ, i.e., in the following configuration:

Output variable 11 (path E)=output variable 12 (path H)="alpha"

AND

Output variable 11 (path F)=Output variable 12 (path G)="beta"

Here, the selected communication device 201 initiates a switchover from the main control units 101-102 to the reserve control units 103-104, where the main control units 101-102 are deactivated.

Figure 3:
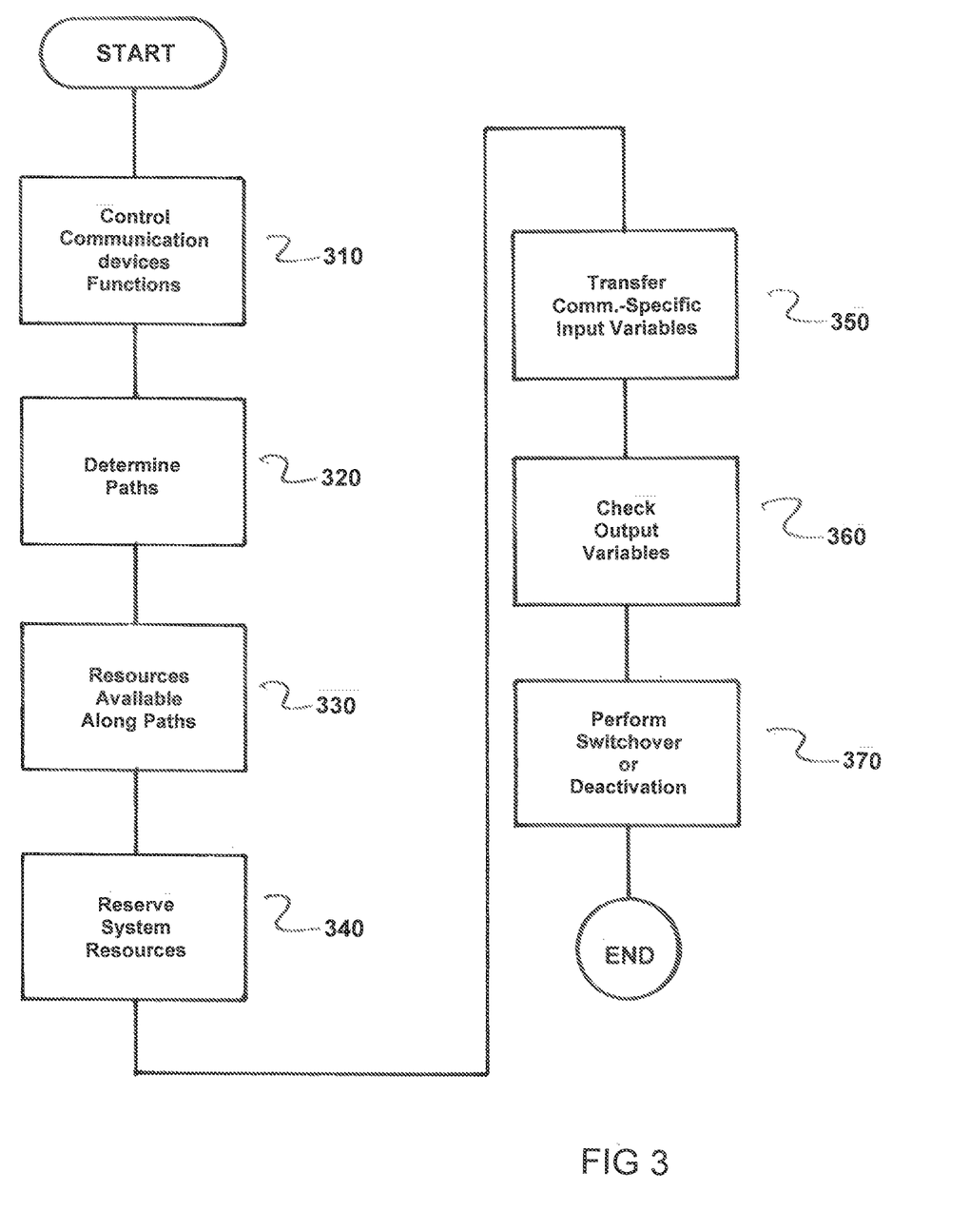
FIG. 3 is a flowchart of the method in accordance with the invention.

FIG. 3 is a flowchart of the method for operating an industrial automation system communication network comprising a plurality of communication devices. The method comprises controlling, by a plurality of control units 101-103; 101-102, 103-104 redundant with respect to each other, functions of a plurality of associated communication devices 201, 202, 203, as indicated in step 310. In accordance with the invention, mutually redundant control units of the plurality of control units 101-103; 101-102, 103-104 comprise identically configured state machines, which in an error-free state generate identical output variables 11-13; 11-12 from identical input variables, the plurality of associated communication devices 201, 202, 203 are assigned to a Software Defined Network comprising a communication control plane designated as a Control Plane and a data transmission plane designated as a Data Plane, and the plurality of control units 101-103; 101-102, 103-104 are assigned to the Control Plane and the plurality of associated communication devices 201, 202, 203 being assigned to the Data Plan.

Next, each control unit of the plurality of control units 101-103; 101-102, 103-104, for user-side communication service requests 10, determines a path between a first communication device at a first end node and a second communication device at a second end node via third communication devices which comprise at least one of (i) routers and (ii) switches, as indicated in step 320. In accordance with the invention, the plurality of control units 101-103; 101-102, 103-104 specify flow tables, from which at least one of (i) routing tables and (ii) forwarding tables are derived for third communication devices respectively assigned to the plurality of control units 101-103; 101-102, 103-104.

Next, the plurality of control units 101-103; 101-102, 103-104 determine whether necessary system resources are available along the determined paths during a scheduled usage period, as indicated in step 330.

Next, the plurality of control units 101-103; 101-102, 103-104 reserve system resources necessary for the communication service requests 10 in the event of each positive verification result and routing or switching functions of the third-party communication devices are controlled in accordance with determined paths, as indicated in step 340.

Next, the plurality of associated communication devices 201, 202, 203 transfer communication-specific input variables 21, 22, 23 to all mutually associated redundant control units of the plurality of control units 101-103; 101-102, 103-104, as indicated in step 350.

Next, the output variables 11-13; 11-12 generated by the mutually redundant control units 101-103; 101-102, 103-104 are checked for deviations from each other, as indicated in step 360.

Next, a switchover to reserve control units 103-104 in the event of deviations is performed or deactivating control units 102 of the plurality of control units 101-103; 101-102, 103-104 having output variables 12 which deviate with respect to a majority of mutually redundant control units 101, 103 of the plurality of control units 101-103; 101-102, 103-104 are deactivated in an event the deviations, as indicated in step 370.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for operating an industrial automation system communication network comprising a plurality of communication devices, the method comprising: controlling, by a plurality of control units redundant with respect to each other, functions of a plurality of associated communication devices, mutually redundant control units of the plurality of control units comprising identically configured state machines, which in an error-free state generate identical output variables from identical input variables, the plurality of associated communication devices being assigned to a Software Defined Network (DPN) comprising a communication control plane designated as a Control Plane (CP) and a data transmission plane designated as a Data Plane (DP), and the plurality of control units being assigned to the Control Plane and the plurality of associated communication devices being assigned to the Data Plan; determining, by each control unit of the plurality of control units, for user-side communication service requests, a path between a first communication device at a first end node and a second communication device at a second end node via third communication devices which comprise at least one of (i) routers and (ii) switches, the plurality of control units specifying flow tables, from which at least one of (i) routing tables and (ii) forwarding tables are derived for third communication devices respectively assigned to the plurality of control units; determining, by the plurality of control units, whether necessary system resources are available along the determined paths during a scheduled usage period; reserving, by the plurality of control units, system resources necessary for the communication service requests in an event of each positive verification result and controlling routing or switching functions of the third-party communication devices in accordance with determined paths; transferring, by the plurality of associated communication devices, communication-specific input variables to all mutually associated redundant control units of the plurality of control units; checking the output variables generated by the mutually redundant control units for deviations from each other; and performing a switchover to reserve control units in an event of deviations or deactivating control units of the plurality of control units having output variables which deviate with respect to a majority of mutually redundant control units of the plurality of control units in an event the deviations.

2. The method as claimed in claim 1, wherein state machines of the mutually redundant control units of the plurality of control units are replicated state machines.

3. The method as claimed in claim 1, wherein the output variables generated by the mutually redundant control units of the plurality of control units are checked for deviations by one of (i) the assigned communication devices and (ii) the control units themselves.

4. The method as claimed in claim 2, wherein the output variables generated by the mutually redundant control units of the plurality of control units are checked for deviations by one of (i) the assigned communication devices and (ii) the control units themselves.

5. The method as claimed in claim 1, wherein the deactivation of control units having output variables that deviate with respect to a majority of mutually redundant control units is performed by one of (i) assigned communication devices and (ii) the control units themselves.

6. The method as claimed in claim 5, wherein the deactivation of control units having output variables which deviate with respect to a majority of mutually redundant control units is performed by ignoring deviating output variables in the assigned communication devices.

7. The method as claimed in claim 1, wherein the mutually redundant control units compare input variables received from assigned communication devices against one another; and wherein control units having input variables which deviate with respect to a majority of mutually redundant control units are deactivated.

8. The method as claimed in claim 7, wherein the control units having input variables that deviate with respect to the majority of mutually redundant control units deactivate themselves.

9. The method as claimed in claim 8, wherein the control units having input variables that deviate with respect to the majority of mutually redundant control units deactivate themselves by a process of generating output variables being stopped or suspended.

10. The method as claimed in claim 1, wherein are provided, in which one pair of mutually redundant main control units of pairs of mutually redundant control units of the plurality of control units is initially activated, and wherein a switchover is performed from the pair of mutually redundant main control units to a pair of mutually redundant reserve control units in an event of deviations of the output variables generated by the mutually redundant main control units.

11. The method as claimed in claim 10, wherein pairs of the mutually redundant main control units monitor each other for at least one of differing input and output variables and deactivate themselves when deviations are found.

12. The method as claimed in claim 10, wherein pairs of mutually redundant main control units which are assigned to the communication devices are entered in a list; and wherein former main control units entered in the list are excluded from use as reserve control units for the respective communication devices.

13. The method as claimed in claim 11, wherein pairs of mutually redundant main control units which are assigned to the communication devices are entered in a list; and wherein former main control units entered in the list are excluded from use as reserve control units for the respective communication devices.

14. The method as claimed in claim 10, wherein the assigned communication devices switch over from the main control units to the reserve control units in an event of at least one of (i) deviating output variables of the mutually redundant main control units of the plurality of control units and (ii) a self-deactivation indicated by the mutually redundant main control units.

15. The method as claimed in claim 10, wherein the output variables of the mutually redundant main control units for a pairwise mutual monitoring are transmitted to a respective other main control unit via each at least two disjoint paths; and wherein the mutually redundant main control units remain activated as long as said mutually redundant main control units receive output variables of the other main control unit which match theft own output variables via at least one path.

16. The method as claimed in claim 10, wherein the output variables of the mutually redundant main control units are transmitted to the assigned communication devices via at least two disjoint paths per main control unit; and wherein the mutually redundant main control units for the respective assigned communication device remain activated as long as the respective assigned communication device receives matching output variables from both main control units via at least two paths and output variables that differ from each other via remaining paths.

17. The method as claimed in claim 1, wherein the communication network is divided into a plurality of partitions comprising specifiable shares of system resources of communication devices which are assigned to the respective partition;
   wherein for user-side communication service requests within the partition assigned to the respective user the control units each determine a path between a first communication device at a first end node and a second communication device at a second end node via third communication devices; and
   wherein the control units verify whether necessary system resources are available along each of the determined paths within the partition assigned to the respective user during a scheduled usage period.

18. The method as claimed in claim 1, wherein the communication-specific input variables comprise at least one of (i) latency, (ii) jitter, (ii) data rate and (iii) at least one of bandwidth measurements and event messages from at least one of routers, switches, and access points.

19. The method as claimed in claim 1, wherein the mutually redundant control units of the plurality of control units are authenticated against the assigned communication devices; and wherein the mutually redundant control units of the plurality of control units obtain control access to the assigned communication devices only after successful authentication.

20. A control unit comprising: a processor; and memory; wherein the processor is configured to: control functions of a plurality of assigned communication devices jointly with at least one redundant control unit, mutually redundant control units comprising identically configured state machines which are configured to generate, in an error-free state; identical output variables given identical input variables, the plurality of assigned communication devices being assigned to a Software Defined Network (SDN) comprising one communication control plane designated as a Control Plane (CP) and one data transmission plane designated as a Data Plane (DP), and the mutually redundant control units being assigned to the Control Plane and the communication devices being assigned to the Data Plane; determine for user-side communication service requests in each case a path between a first communication device at a first end node and a second communication device at a second end node via third communication devices comprising at least one of (i) routers and (ii) switches, and the mutually redundant control units specifying flow tables, from which at least one of (i) routing tables and (ii) forwarding tables for third communication devices respectively assigned to the control units are derivable; verify whether necessary system resources are available along the determined paths during a scheduled usage period; reserve system resources necessary for each communication service requests in an event of a positive verification result and control routing or switching functions of the third communication devices in accordance with the determined paths; receive at least one of (i) measurements and (ii) event messages from assigned communication devices as input variables; check their own output variables and the output variables of the redundant control unit for deviations relative to each other; switch over to reserve control units or deactivate control units having output variables that deviate with respect to a majority of mutually redundant control units in the event of deviations.

* * * * *